No. 772,284. PATENTED OCT. 11, 1904.
A. N. LUKENS.
BEARING END FOR SEMIELLIPTIC SPRINGS.
APPLICATION FILED JULY 29, 1904.
NO MODEL. 2 SHEETS—SHEET 1.

WITNESSES
S. C. Connor
A. C. Powell

INVENTOR
Alan N. Lukens
by Howson and Howson
ATTORNEYS

No. 772,284. PATENTED OCT. 11, 1904.
A. N. LUKENS.
BEARING END FOR SEMIELLIPTIC SPRINGS.
APPLICATION FILED JULY 29, 1904.
NO MODEL. 2 SHEETS—SHEET 2.

WITNESSES
S. C. Connor
A. E. Rowell

INVENTOR
Alan N. Lukens
BY Howson and Howson
ATTORNEYS

No. 772,284.

Patented October 11, 1904.

UNITED STATES PATENT OFFICE.

ALAN N. LUKENS, OF ELIZABETH, NEW JERSEY, ASSIGNOR TO RAILWAY STEEL-SPRING COMPANY, A CORPORATION OF NEW JERSEY.

BEARING END FOR SEMIELLIPTIC SPRINGS.

SPECIFICATION forming part of Letters Patent No. 772,284, dated October 11, 1904.

Application filed July 29, 1904. Serial No. 218,760. (No model.)

*To all whom it may concern:*

Be it known that I, ALAN N. LUKENS, a citizen of the United States of America, residing in Elizabeth, in the county of Union, State of New Jersey, have invented an Improved Bearing End for Semielliptic Springs, of which the following is a specification.

My invention relates particularly to that type of bearing end of semielliptic springs commonly known as the "bulb" end. Bearing ends of this pattern have heretofore been made by welding a pad of metal, preferably wrought-iron, to either end of the main or back plate of the semielliptic spring and forming this pad by forging in suitably-shaped dies to the exact shape and size required. This method of welding necessitates the heating of the pad and the end of the steel spring-plate to a high welding heat, endangering the quality of the steel in the spring-plate at a very vital point. In fact, the danger of totally destroying the steel by burning is very great, even in the hands of the most skilled artisan. Moreover, the operation is cumbersome and expensive.

My improvement consists in bending the end of the main or back spring-plate to form the shape of the bearing end and filling the resulting space between the shaped end of the main plate and the second plate of the spring with a filler-block. This filler-block is held in place by the spring-plates themselves and by a lug or projection engaging with a notch or hole in the main plate, or by other suitable means.

My improvement entirely obviates the danger of burning the steel, as the heat required for the operation is a low one, producing no deleterious effect in the material, and at the same time a much better and more serviceable bearing end is produced. The spring-steel itself forming the wearing-surface instead of soft wrought-iron adds greatly to the life and effectiveness of the bearing ends.

Figure 1:
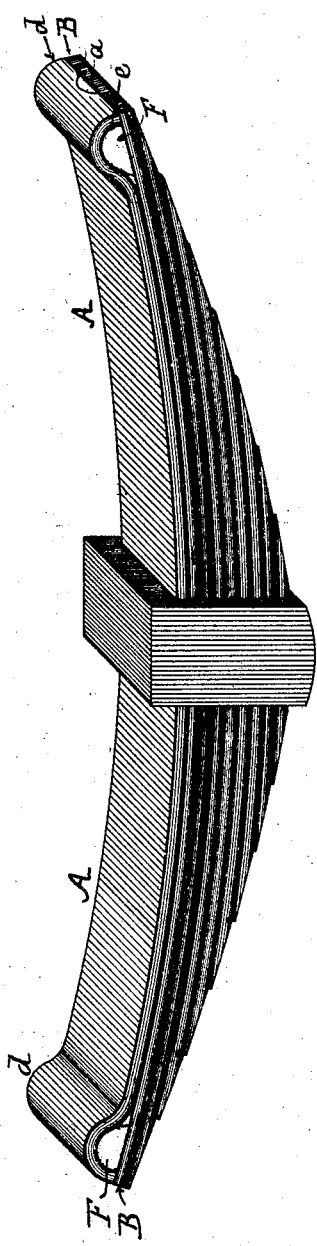
Figure 2:
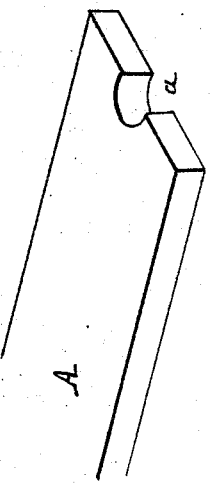
Figure 3:
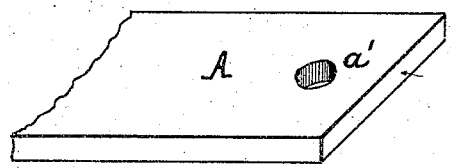
Figure 4:
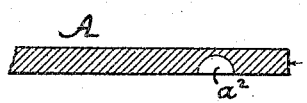
Figure 5:
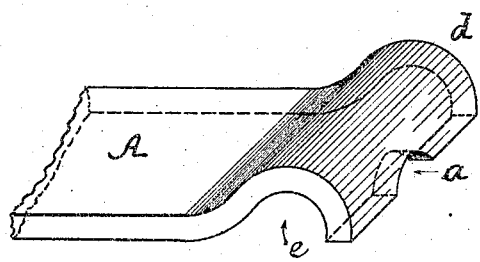
Figure 6:
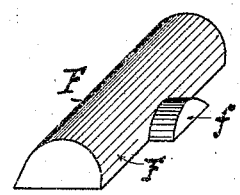
Figure 7:
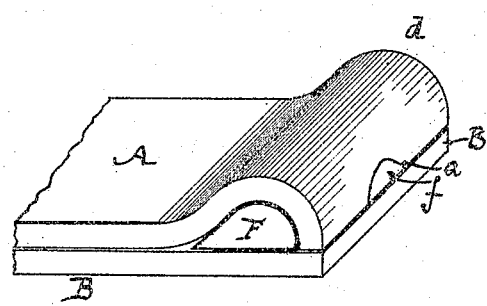
Figure 8:
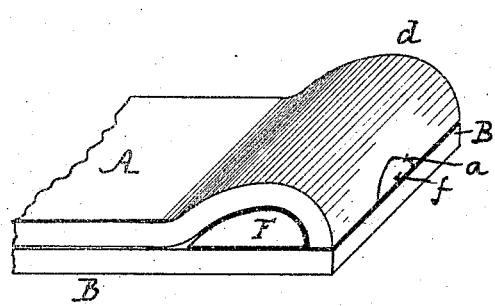

In the accompanying drawings, Figure 1 is a perspective view of a complete semielliptical spring equipped with my improvements. Fig. 2 is a perspective view of one end of a main or back plate as prepared for bending to the shape of the bearing end. Fig. 3 is a similar view of a modification. Fig. 4 is a sectional view of another modification. Fig. 5 shows the end of a main plate after it has been bent to form the shape of the bulb end. Fig. 6 is a perspective view of a filler-piece, and Figs. 7 and 8 show slightly-different forms of completed bearing ends with the filler-pieces in place between such bearing end and the second plate of the spring.

In carrying out my invention in its preferred form I first cut a notch $a$, Fig. 2, in each extreme end of the main or back plate A, as illustrated in Fig. 2. This notch may be of any shape or size suitable, and while there may be one or more of them I prefer and deem it more expedient to use one semicircular notch, as shown. In place of the notch illustrated in Fig. 2 a hole $a'$ may be used, as illustrated in Fig. 3, or a recess, as at $a^2$ in Fig. 4, may be provided. I then bend up each notched end of the main plate to form the shape of the bulb end, as at $d$, Fig. 5, leaving under it a vacant space $e$ to be filled. For this vacant space I provide a filler-block F, preferably of metal, this filler-block being provided with a suitably-shaped projection $f$ to engage with the notch $a$ or hole or recess in the end of the back or main plate. The projection may be integral with the filler-piece or attachable thereto in any suitable way. As illustrated in the two slightly-varying designs in Figs. 7 and 8 and as also shown in Fig. 1, this filler-piece F when in place will lie between the main plate A and the second plate B of the spring, and thus be confined between these plates of the spring, while the engaging projection and notches on the filler-piece and the main plate will prevent the filler-piece from slipping out laterally.

I claim as my invention—

1. In a bearing end for a half-elliptic spring, the combination of a main plate and a second plate, the main plate bent to form the shape of a bearing end and leaving a vacant space in the shaped portion open to the surface of the second plate of the spring, which vacant space is adapted to be filled with a filler-block.

2. In a bearing end for a half-elliptic spring, a main plate bent to form the shape of the bearing end and having a notch or hole at or near the extreme end of the main plate to receive a projection on a filler-block.

3. In a bearing end for a half-elliptic spring, a main plate bent to form the shape of the bearing end, with a filler-block under said bearing end, and means to hold said filler-block in place.

4. In a bearing end for a half-elliptic spring, a main plate bent to form the shape of the bearing end with a filler-block having a projection engaging the main plate and said block being held in position by the shaped end of the main plate, the projection on the filler-block and the second plate of the spring.

5. A metallic filler-block for the bearing end of a semielliptic spring, said filler-block being shaped to fit the resulting space under the bearing end when the main spring-plate is bent to form the shape of the bearing end and having a projection to engage a hole or notch in the main spring-plate.

6. The combination of a main plate and second plate of a semielliptic spring, the main plate being bent to form the shape of the bearing end with a filler-piece between said bent end of the main plate and the second plate and means to hold the filler-piece in place between said plates.

7. A half-elliptic spring having a main plate and a second plate, the main plate curved up and away from the second plate at a suitable distance from the end of the second plate to form a bearing end, and then curved downwardly with its extremity against said second plate.

In testimony whereof I have signed my name to this specification in the presence of two subscribing witnesses.

ALAN N. LUKENS.

Witnesses:
FRANK A. BUTLER,
EDNA W. COLLINS.